US010943133B2

United States Patent
Oniwa et al.

(10) Patent No.: US 10,943,133 B2
(45) Date of Patent: Mar. 9, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yoshihiro Oniwa, Wako (JP); Hironobu Kiryu, Wako (JP); Mahito Shikama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 16/351,775

(22) Filed: Mar. 13, 2019

(65) Prior Publication Data

US 2019/0311207 A1    Oct. 10, 2019

(30) Foreign Application Priority Data

Apr. 4, 2018    (JP) .............................. JP2018-072372

(51) Int. Cl.
*G06K 9/00* (2006.01)
*G06K 9/32* (2006.01)
(Continued)

(52) U.S. Cl.
CPC ....... *G06K 9/00818* (2013.01); *B60W 30/146* (2013.01); *B60W 50/12* (2013.01); *G06K 9/3258* (2013.01)

(58) Field of Classification Search
CPC . G06K 9/00818; G06K 9/3258; B60W 50/12; B60W 30/146; B60W 60/0055;
(Continued)

(56) References Cited

U.S. PATENT DOCUMENTS 9,829,884 B1 * 11/2017 Trigui .................. G05D 1/0061
10,089,870 B2 * 10/2018 Ro ...................... G06K 9/00818
(Continued)

FOREIGN PATENT DOCUMENTS

DE    102007021580    11/2018
JP       10-315801    12/1998
(Continued)

OTHER PUBLICATIONS

Japanese Office Action for Japanese Patent Application No. 2018-072372 dated Sep. 17, 2019.

*Primary Examiner* — Ming Y Hon
(74) *Attorney, Agent, or Firm* — Amin, Turocy & Watson, LLP

(57) ABSTRACT

A vehicle control device includes a recognizer and a driving controller. The driving controller operates at least in one of a first control state and a second control state in which a automation rate is higher than the first control state or a lower level of task is required of an occupant than the first control state. The driving controller does not suppress operation in the second control state if a traffic sign recognized by the recognizer is a sign indicating a speed limit equal to or higher than a predetermined speed and suppresses operation in the second control state if the traffic sign is a sign indicating a speed limit less than the predetermined speed.

12 Claims, 10 Drawing Sheets

(51) Int. Cl.
*B60W 50/12* (2012.01)
*B60W 30/14* (2006.01)

(58) Field of Classification Search
CPC ....... B60W 2554/804; B60W 2556/50; B60W 2554/801; B60W 2555/60
See application file for complete search history.

(56) References Cited

U.S. PATENT DOCUMENTS

| | | | | |
|---|---|---|---|---|
| 2005/0216169 A1* | 9/2005 | Arai | ................... | B60K 31/0008 701/96 |
| 2008/0270001 A1* | 10/2008 | Seto | ................... | B60K 31/00 701/93 |
| 2011/0169626 A1* | 7/2011 | Sun | ................... | G08G 1/09623 340/439 |
| 2012/0223845 A1* | 9/2012 | Schumann | ....... | G08G 1/0967 340/995.19 |
| 2012/0253628 A1* | 10/2012 | Maruyama | ............ | B60K 31/18 701/93 |
| 2014/0176321 A1* | 6/2014 | Chen | ................... | B60W 30/14 340/435 |
| 2014/0306833 A1* | 10/2014 | Ricci | ................ | H04W 36/0005 340/901 |
| 2016/0117923 A1* | 4/2016 | Dannenbring | ..... | G08G 1/09623 340/905 |
| 2016/0328976 A1* | 11/2016 | Jo | ......................... | B60W 10/06 |
| 2018/0239352 A1* | 8/2018 | Wang | .................. | B60W 30/182 |
| 2019/0092327 A1* | 3/2019 | Osaki | .................... | B60W 30/16 |
| 2019/0094036 A1* | 3/2019 | Osaki | .................... | G08G 1/0125 |
| 2019/0126927 A1* | 5/2019 | Uejima | ........... | B60W 30/18163 |
| 2019/0220030 A1* | 7/2019 | Ohmura | ................ | G05D 1/0223 |
| 2020/0010085 A1* | 1/2020 | Ohmura | .............. | B60W 30/143 |

FOREIGN PATENT DOCUMENTS

| | | |
|---|---|---|
| JP | 3239727 | 12/2001 |
| JP | 3210379 | 5/2017 |
| JP | 2017-132290 | 8/2017 |
| JP | 2018-020781 | 2/2018 |
| JP | 2018-021832 | 2/2018 |
| WO | 2017/163606 | 9/2017 |

* cited by examiner

FIG. 4

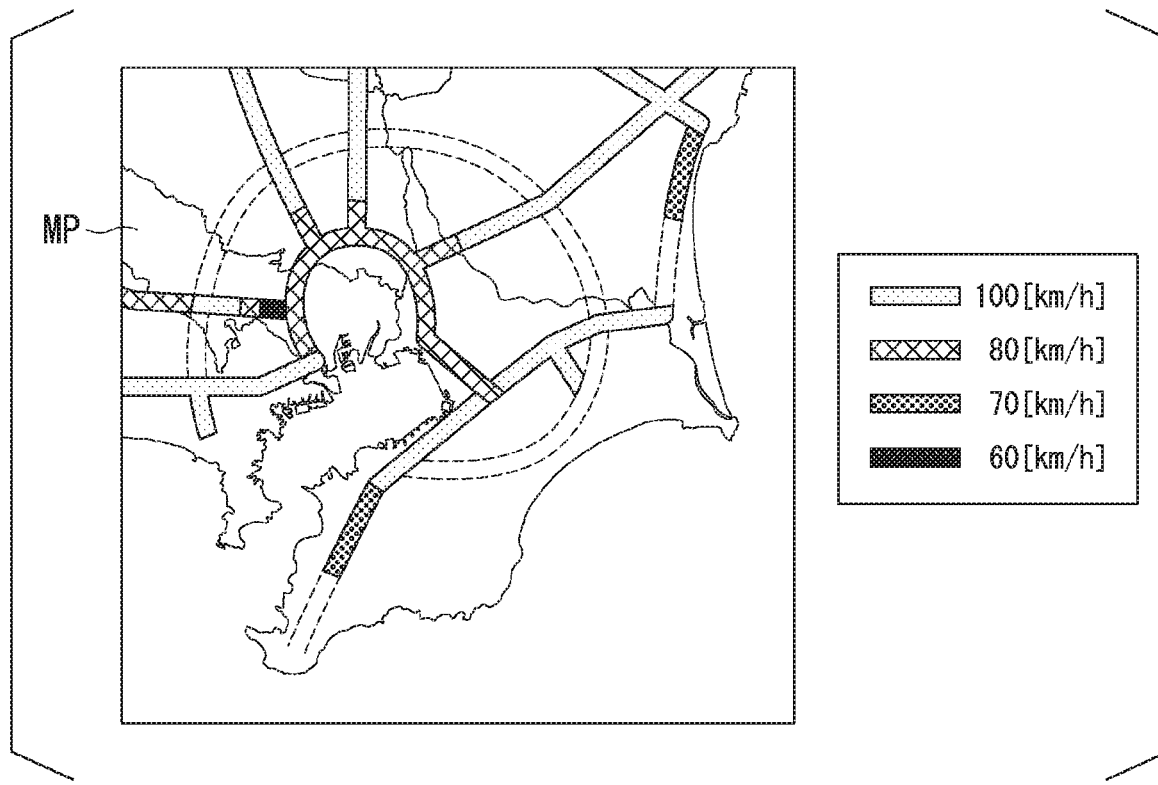

| CONTROL STATE | FIRST CONDITION | SECOND CONDITION |
|---|---|---|
| THIRD CONTROL STATE (WITH CONTROL DEGREE 4) | DURING CONGESTION 40 km/h OR LESS | SPEED LIMIT EQUAL TO OR HIGHER THAN 70 km/h |
| | DURING CONGESTION 20 km/h OR LESS | SPEED LIMIT LESS THAN 70 km/h |
| SECOND CONTROL STATE (WITH CONTROL DEGREE 3) | POSITION INFORMATION (MAIN LINE OF EXPRESSWAY) | SPEED LIMIT EQUAL TO OR HIGHER THAN 70 km/h |
| SECOND CONTROL STATE (WITH CONTROL DEGREE 2) | POSITION INFORMATION (BRANCH/MERGE POINT) | SPEED LIMIT EQUAL TO OR HIGHER THAN 40 km/h |
| FIRST CONTROL STATE (WITH CONTROL DEGREE 1) | POSITION INFORMATION (GENERAL ROAD, ETC.) | SPEED LIMIT LESS THAN 40 km/h |
| ... | ... | ... |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-072372, filed Apr. 4, 2018, the content of which is incorporated herein by reference.

BACKGROUND

Field of the Invention

The present invention relates to a vehicle control device, a vehicle control method, and a storage medium.

Description of Related Art

In recent years, research on automated control of a vehicle has been conducted. In relation to this, a technology in which control for switching between autonomous travel through automated driving and manual travel is performed on the basis of the position of the own vehicle and map data or constant speed travel control through automated driving is released to change the degree of driving when the travel position of the own vehicle has reached a control release position is known (for example, Japanese Patent No. 3239727 and Japanese Unexamined Patent Application, First Publication No. H10-315801).

SUMMARY

However, in the related art, the timing at which driving control is actually switched or the degree of driving control sometimes does not match the actual traffic flow since driving control is switched unilaterally on the basis of the position of the own vehicle and the map data.

Aspects of the present invention have been made in view of such circumstances and it is an object of the present invention to provide a vehicle control device, a vehicle control method, and a storage medium with which it is possible to perform driving control that matches traffic flow.

A vehicle control device, a vehicle control method, and a storage medium according to the present invention adopt the following configurations.

(1) A vehicle control device according to an aspect of the present invention includes a recognizer configured to recognize content of a traffic sign corresponding to a road on which a vehicle is present, and a driving controller configured to perform driving control for controlling one or both of steering or acceleration/deceleration of the vehicle on the basis of the content of the traffic sign recognized by the recognizer, wherein the driving controller is configured to operate at least in one of a first control state and a second control state in which an automation rate is higher than the first control state or a lower level of task is required of an occupant than the first control state, and the driving controller is configured not to suppress operation in the second control state if the traffic sign recognized by the recognizer is a sign indicating a speed limit equal to or higher than a predetermined speed and configured to suppress operation in the second control state if the traffic sign is a sign indicating a speed limit less than the predetermined speed.

(2) In the vehicle control device according to the above aspect (1), the driving controller is configured to suppress operation in the second control state further on the basis of at least one of presence or absence of a vehicle preceding the vehicle, a type of the preceding vehicle, or a travel speed of the preceding vehicle.

(3) In the vehicle control device according to the above aspect (1), the driving controller is configured to enable operation of a third control state in which the automation rate is higher than the second control state or a lower level of task is required of the occupant than the second control state, and to update an execution condition of the third control state on the basis of a speed limit of the traffic sign recognized by the recognizer.

(4) In the vehicle control device according to the above aspect (1), the driving controller is configured to enable operation of a third control state in which the automation rate is higher than the second control state or a lower level of task is required of the occupant than the second control state, and the driving controller is configured to shift from the first control state to the third control state without going through the second control state if a condition for shifting to the third control state is satisfied during operation of the first control state.

(5) In the vehicle control device according to the above aspect (1), wherein the recognizer is configured to distinguish between and recognize a fixed sign and a variable sign among the traffic signs, and the driving controller is configured to make a reference for suppressing operation in the second control state different between when the fixed sign has been recognized by the recognizer and when the variable sign has been recognized.

(6) In the vehicle control device according to the above aspect (5), the driving controller is configured to prioritize the variable sign when both the fixed sign and the variable sign have been recognized by the recognizer.

(7) In the vehicle control device according to the above aspect (5), the driving controller is configured to prioritize a lower speed limit among speed limits of the fixed sign and the variable sign when both the fixed sign and the variable sign have been recognized by the recognizer.

(8) In the vehicle control device according to the above aspect (5), the driving controller is configured to suppress operation in the second control state when the fixed sign has been recognized by the recognizer once and to suppress operation in the second control state when the variable sign has been recognized by the recognizer a plurality of times.

(9) The vehicle control device according to the above aspect (1) further includes a notification unit configured to notify an occupant of the vehicle of information, and a notification controller configured to cause the notification unit to notify the occupant of information, wherein the driving controller is configured to cause the notification controller to notify the occupant of information regarding the traffic sign when a number of times the traffic sign has been recognized by the recognizer is less than a predetermined number and to suppress operation in the second control state when the number of times the traffic sign has been recognized is equal to or greater than the predetermined number.

(10) The vehicle control device according to the above aspect (1) further includes a setting unit configured to set a target speed of the vehicle on the basis of the occupant's operation, wherein the driving controller is configured to correct content of the driving control on the basis of a speed of the traffic sign recognized by the recognizer and the target speed set by the setting unit.

(11) A vehicle control device according to an aspect of the present invention includes a recognizer configured to recognize a surrounding situation of a vehicle, and a driving controller configured to perform driving control for controlling one or both of steering or acceleration/deceleration of the vehicle on the basis of the surrounding situation recognized by the recognizer, wherein the driving controller is configured to operate at least in one of a first control state, a second control state in which an automation rate is higher than the first control state or a lower level of task is required of the occupant than the first control state, and a third control state in which an automation rate is higher than the second control state or a lower level of task is required of the occupant than the second control state on the basis of the surrounding situation recognized by the recognizer, and the driving controller is configured to be able to shift from the first control state to the third control state without going through the second control state if a condition for shifting to the third control state is satisfied during operation of the first control state.

(12) A vehicle control method according to an aspect of the present invention includes a vehicle control device recognizing content of a traffic sign corresponding to a road on which a vehicle is present, and performing driving control for controlling one or both of steering or acceleration/deceleration of the vehicle on the basis of the recognized content of the traffic sign, wherein the vehicle control device operates at least in one of a first control state and a second control state in which an automation rate is higher than the first control state or a lower level of task is required of an occupant than the first control state, and does not suppress operation in the second control state if the recognized traffic sign is a sign indicating a speed limit equal to or higher than a predetermined speed and suppresses operation in the second control state if the traffic sign is a sign indicating a speed limit less than the predetermined speed.

(13) A storage medium according to an aspect of the present invention is a computer readable non-transitory storage medium storing a program causing a vehicle control device to recognize content of a traffic sign corresponding to a road on which a vehicle is present, and to perform driving control for controlling one or both of steering or acceleration/deceleration of the vehicle on the basis of the recognized content of the traffic sign, wherein the vehicle control device operates at least in one of a first control state and a second control state in which an automation rate is higher than the first control state or a lower level of task is required of an occupant than the first control state, and the vehicle control device is caused not to suppress operation in the second control state if the recognized traffic sign is a sign indicating a speed limit equal to or higher than a predetermined speed and caused to suppress operation in the second control state if the traffic sign is a sign indicating a speed limit less than the predetermined speed.

According to any of the above aspects (1) to (13), it is possible to perform driving control that matches traffic flow.

BRIEF DESCRIPTION OF THE DRAWINGS

FIG. 4 is a diagram showing an example of a speed limit included in map information.

FIG. 5 is a diagram showing an example of the content of control state change data.

DESCRIPTION OF EMBODIMENTS

Hereinafter, embodiments of a vehicle control device, a vehicle control method, and a storage medium of the present invention will be described with reference to the drawings. The vehicle control device of the embodiment is applied to an automatically driven vehicle. Automated driving is, for example, performing driving control by controlling one or both of the steering or acceleration/deceleration of a vehicle. Control states of the driving control that can be performed by the automatically driven vehicle include a first control state and a second control state in which the automation rate is higher than the first control state or a lower level of task is required of an occupant than the first control state. The control states may also include a third control state in which the automation rate is higher than the second control state or a lower level of task is required of the occupant than the second control state. The task required of the occupant includes, for example, operating a driving operator and monitoring the surroundings of the own vehicle. The following description will be given with reference to the case in which left-hand traffic laws are applied, but the terms "left" and "right" simply need to be read in reverse when right-hand traffic laws are applied.

[Overall Configuration]

Figure 1:
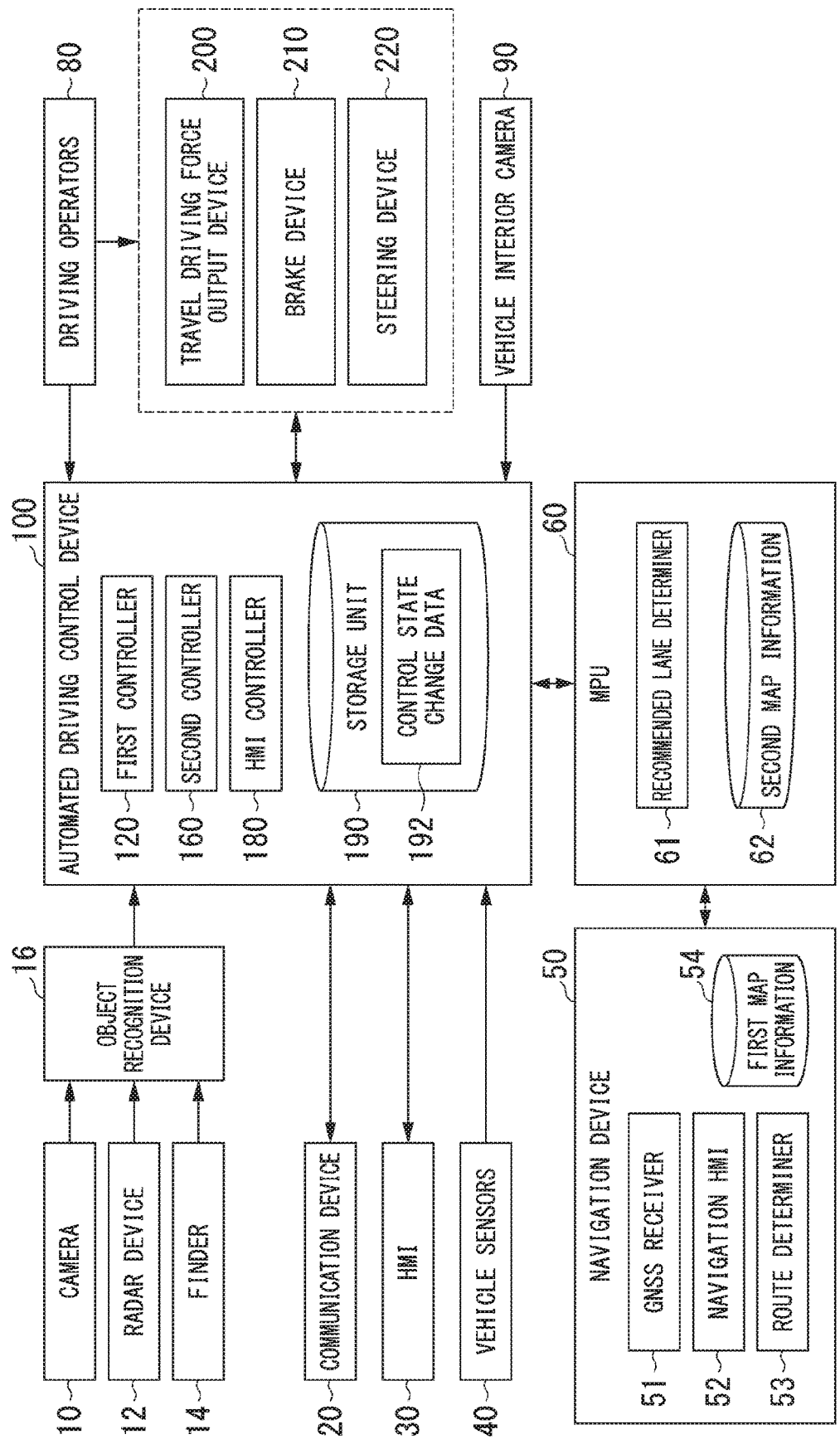
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, vehicle sensors 40, a navigation device 50, a map positioning unit (MPU) 60, driving operators 80, a vehicle interior camera 90, an automated driving control device 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG.

1 are merely an example and some of the components may be omitted or other components may be added. The automated driving control device 100 is an example of the "vehicle control device." The HMI 30 is an example of the "setting unit." The HMI 30 is also an example of the "notification unit." The HMI controller 180 is an example of the "notification controller."

The camera 10 is, for example, a digital camera using a solid-state imaging device such as a charge coupled device (CCD) or a complementary metal oxide semiconductor (CMOS). The camera 10 is attached to the vehicle in which the vehicle system 1 is mounted (hereinafter referred to as an own vehicle M) at an arbitrary location. For imaging the area in front of the vehicle, the camera 10 is attached to an upper portion of a front windshield, a rear surface of a rearview mirror, or the like. For example, the camera 10 repeats imaging of the surroundings of the own vehicle M at regular intervals. The camera 10 may also be a stereo camera.

The radar device 12 radiates radio waves such as millimeter waves around the own vehicle M and detects radio waves reflected by an object (reflected waves) to detect at least the position (distance and orientation) of the object. The radar device 12 is attached to the own vehicle M at an arbitrary location. The radar device 12 may detect the position and velocity of an object using a frequency modulated continuous wave (FM-CW) method.

The finder 14 is a light detection and ranging (LIDAR) finder. The finder 14 illuminates the surroundings of the own vehicle M with light and measures scattered light. The finder 14 detects the distance to a target on the basis of a period of time from when light is emitted to when light is received. The light radiated is, for example, pulsed laser light. The finder 14 is attached to the own vehicle M at an arbitrary location.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control device 100. The object recognition device 16 may output detection results of the camera 10, the radar device 12 and the finder 14 to the automated driving control device 100 as they are. The object recognition device 16 may be omitted from the vehicle system 1. The camera 10 includes not only one that captures normal images but also an infrared camera that captures images of changes in the surface temperatures of objects. The camera 10 may be switched between normal imaging and infrared imaging through a function of the camera 10.

For example, the communication device 20 communicates with other vehicles near the own vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own vehicle M and receives an input operation from the occupant. The HMI 30 includes various display devices, a speaker, a buzzer, a touch panel, switches, keys, light emitting devices provided in the occupant compartment, and the like. The HMI 30 includes, for example, a switch or the like for receiving a setting of a target speed from the occupant. The HMI 30 includes, for example, a turn signal operator for operating the on and off of a turn signal indicating whether the travel direction of the own vehicle M will be left or right in the future.

The vehicle sensors 40 include a vehicle speed sensor that detects the speed of the own vehicle M, an acceleration sensor that detects the acceleration thereof, a yaw rate sensor that detects an angular speed thereof about the vertical axis, an orientation sensor that detects the orientation of the own vehicle M, or the like. For example, the acceleration includes at least one of a longitudinal acceleration in the travel direction of the own vehicle M or a lateral acceleration in the lateral direction of the own vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the own vehicle M on the basis of signals received from GNSS satellites. The position of the own vehicle M may also be specified or supplemented by an inertial navigation system (INS) using the output of the vehicle sensors 40. The navigation HMI 52 includes a display device, a speaker, a touch panel, a key, or the like. The navigation HMI 52 may be partly or wholly shared with the HMI 30 described above. For example, the route determiner 53 determines a route from the position of the own vehicle M specified by the GNSS receiver 51 (or an arbitrary input position) to a destination input by the occupant (hereinafter referred to as an on-map route) using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The first map information 54 may also include information regarding features. Information regarding a feature includes a feature ID that is identification information of the feature, position information of the feature, the attribute (genre) of the feature, and guidance information based on the feature. Features include landmarks and tourist areas (for example, mountains, waterfalls, and lakes), famous buildings (for example, temples and bridges), and commercial facilities such as theme parks and shopping malls. In computer processing, a feature may be a point on the map or may be an area having a size. The information regarding features may be set in the first map information 54 by default or may be acquired from a map server or the like via the Internet or the like. The on-map route is output to the MPU 60. The navigation device 50 may also perform route guidance using the navigation HMI 52 on the basis of the on-map route. The navigation device 50 may be realized, for example, by a function of a terminal device such as a smartphone or a tablet possessed by the occupant. The navigation device 50 may also transmit the current position and the destination to a navigation server via the communication device 20 and acquire a route equivalent to the on-map route from the navigation server.

The MPU 60 includes, for example, a recommended lane determiner 61 and holds second map information 62 in a storage device such as an HDD or a flash memory. The recommended lane determiner 61 divides the on-map route provided from the navigation device 50 into a plurality of blocks (for example, into blocks each 100 meters long in the direction in which the vehicle travels) and determines a recommended lane for each block by referring to the second map information 62. The recommended lane determiner 61 determines the number of the lane from the left in which to travel. When there is a branch point on the on-map route, the recommended lane determiner 61 determines a recommended lane such that the own vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include traffic signs, road information, traffic regulation information, address information (addresses/postal codes), facility information, telephone number information, or the like. The second map information 62 may be updated as needed by the communication device 20 communicating with another device.

The driving operators 80 include, for example, an accelerator pedal, a brake pedal, a shift lever, a steering wheel, a different shaped steering member, a joystick, and other operators. Sensors for detecting the amounts of operation or the presence or absence of operation are attached to the driving operators 80. Results of the detection are output to the automated driving control device 100 or some or all of the travel driving force output device 200, the brake device 210, and the steering device 220.

For example, the vehicle interior camera 90 captures an image including the face of the occupant seated in a seat installed in the occupant compartment of the own vehicle M. The occupant is, for example, an occupant seated in the driver's seat, and may also be an occupant (a ride sharing partner) seated in a front occupant seat or a rear seat. The vehicle interior camera 90 is, for example, a digital camera using a solid-state imaging device such as a CCD or a CMOS. The vehicle interior camera 90 captures images of the occupant, for example, at predetermined timings. The captured image of the vehicle interior camera 90 is output to the first controller 120.

The automated driving control device 100 includes, for example, a first controller 120, a second controller 160, the HMI controller 180, and the storage unit 190. Each of these components is realized, for example, by a hardware processor such as a central processing unit (CPU) executing a program (software). Some or all of these components may be realized by hardware (including circuitry) such as large scale integration (LSI), an application specific integrated circuit (ASIC), a field-programmable gate array (FPGA), or a graphics processing unit (GPU) or may be realized by hardware and software in cooperation. The program may be stored in a storage device such as an HDD or a flash memory in the automated driving control device 100 in advance or may be stored in a detachable storage medium such as a DVD or a CD-ROM and then installed in the HDD or the flash memory in the automated driving control device 100 by inserting the storage medium into a drive device. A combination of the behavior plan generator 140 and the second controller 160 is an example of the "driving controller." The driving controller performs driving control in any of the first to third control states by controlling one or both of the steering or acceleration/deceleration of the own vehicle M on the basis of a surrounding situation recognized by the recognizer 130.

Figure 2:
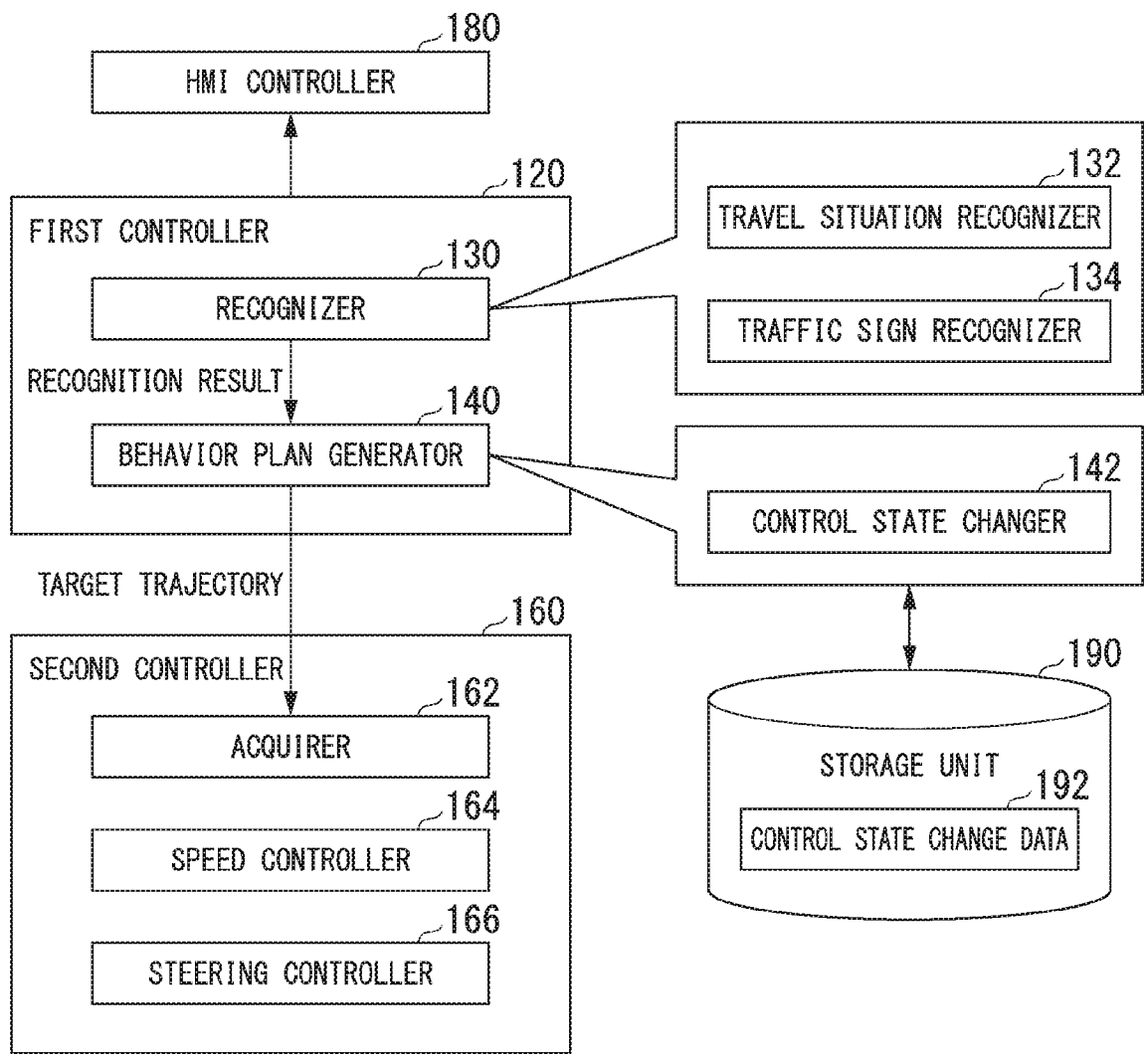
FIG. 2 is a functional configuration diagram of a first controller, a second controller, an HMI controller, and a storage unit.

FIG. 2 is a functional configuration diagram of the first controller 120, the second controller 160, the HMI controller 180, and the storage unit 190. The first controller 120 includes, for example, a recognizer 130 and a behavior plan generator 140. For example, the first controller 120 realizes a function based on artificial intelligence (AI) and a function based on a previously given model in parallel. For example, the function of "recognizing an intersection" is realized by performing recognition of an intersection through deep learning or the like and recognition based on previously given conditions (presence of a signal, a road sign, or the like for which pattern matching is possible) in parallel and evaluating both comprehensively through scoring. This guarantees the reliability of automated driving.

The recognizer 130 recognizes states of objects present near the own vehicle M such as the position, orientation, speed and acceleration thereof on the basis of information input from the camera 10, the radar device 12, and the finder 14 via the object recognition device 16. The objects include, for example, obstacles such as pedestrians, moving objects such as other vehicles, and construction sites. The position of an object is recognized, for example, as a position in a relative coordinate system whose origin is at a representative point on the own vehicle M (such as the center of gravity or the center of a drive shaft thereof), and used for control. The position of the object may be represented by a representative point on the object such as the center of gravity or a corner thereof or may be represented by an expressed region. The "states" of an object may include an acceleration or jerk of the object or a "behavior state" thereof (for example, whether or not the object is changing or is going to change lanes).

The recognizer 130 recognizes, for example, a lane in which the own vehicle M is traveling (traveling lane). For example, the recognizer 130 recognizes the traveling lane, for example, by comparing a pattern of road lane lines (for example, an arrangement of solid and broken lines) obtained from the second map information 62 with a pattern of road lane lines near the own vehicle M recognized from an image captured by the camera 10. The recognizer 130 may also recognize the traveling lane by recognizing travel boundaries (road boundaries) including road lane lines, road shoulders, curbs, a median strip, guardrails, or the like, without being limited to road lane lines. This recognition may be performed taking into consideration a position of the own vehicle M acquired from the navigation device 50 or a result of processing by the INS. The recognizer 130 may also recognize the width of an obstacle, the height, the shape, or the like thereof on the basis of the image captured by the camera 10. The recognizer 130 also recognizes sidewalks, temporary stop lines, obstacles, red lights, toll gates, road structures, and other road phenomena.

When recognizing the traveling lane, the recognizer 130 recognizes the position or attitude of the own vehicle M with respect to the traveling lane. For example, the recognizer 130 may recognize both a deviation from the lane center of the reference point of the own vehicle M and an angle formed by the travel direction of the own vehicle M relative to an extension line of the lane center as the relative position and attitude of the own vehicle M with respect to the traveling lane. Alternatively, the recognizer 130 may recognize the position of the reference point of the own vehicle M with respect to one of the sides of the traveling lane (a road lane line or a road boundary) or the like as the relative position of the own vehicle M with respect to the traveling lane. The recognizer 130 may also recognize structures on a road (for example, a utility pole and a median strip) on the basis of the first map information 54 or the second map information 62. The functions of the travel situation recognizer 132 and the traffic sign recognizer 134 of the recognizer 130 will be described later.

The behavior plan generator 140 generates a target trajectory along which the own vehicle M will travel in the future automatically (independently of the driver's operation), basically such that the own vehicle M travels in the recommended lane determined by the recommended lane determiner 61 and copes with situations occurring near the own vehicle M. The target trajectory includes, for example, a speed element. The target trajectory is expressed, for example, by an arrangement of points (trajectory points) which are to be reached by the own vehicle M in order. The trajectory points are points to be reached by the own vehicle M at intervals of a predetermined travel distance (for example, at intervals of about several meters) along the road. Apart from this, a target speed and a target acceleration for each predetermined sampling time (for example, every several tenths of a second) are determined as a part of the target trajectory. The trajectory points may be respective positions at the predetermined sampling times which the own vehicle M is to reach at the corresponding sampling times. In this case, information on the target speed or the target acceleration is represented with the interval between the trajectory points.

When generating the target trajectory, the behavior plan generator 140 may set an automated driving event. Examples of the automated driving event include a constant-speed travel event, a low-speed following travel event, a lane change event, a branching event, a merging event, a takeover event, and an avoidance event. The behavior plan generator 140 generates the target trajectory according to an activated event. The functions of a control state changer 142 in the behavior plan generator 140 will be described later.

The second controller 160 controls the travel driving force output device 200, the brake device 210, and the steering device 220 such that the own vehicle M passes through the target trajectory generated by the behavior plan generator 140 at scheduled times.

The second controller 160 includes, for example, an acquirer 162, a speed controller 164, and a steering controller 166. The acquirer 162 acquires information on the target trajectory (trajectory points) generated by the behavior plan generator 140 and stores it in a memory (not shown). The speed controller 164 controls the travel driving force output device 200 or the brake device 210 on the basis of the speed element included in the target trajectory stored in the memory. The steering controller 166 controls the steering device 220 according to the degree of curvature of the target trajectory stored in the memory. The processing of the speed controller 164 and the steering controller 166 is realized, for example, by a combination of feedforward control and feedback control. As one example, the steering controller 166 performs the processing by combining feedforward control according to the curvature of the road ahead of the own vehicle M and feedback control based on deviation from the target trajectory.

The HMI controller 180 notifies the occupant of predetermined information through the HMI 30. The predetermined information is, for example, information for assigning a required task to the occupant, information for causing the occupant to operate a driving operator 80, or information relating to the travel of the own vehicle M such as a control state. The predetermined information may also include information not relating to the travel of the own vehicle M such as a television show or content (for example, a movie) stored in a storage medium such as a DVD. The HMI controller 180 outputs information received through the HMI 30 to the communication device 20, the navigation device 50, the first controller 120, and the like.

The storage unit 190 is realized by a nonvolatile storage device such as a read only memory (ROM), an electrically erasable programmable read only memory (EEPROM), or an HDD, and a volatile storage device such as such as a random access memory (RAM) or a register. The storage unit 190 stores, for example, control state change data 192 and other information.

The travel driving force output device 200 outputs a travel driving force (torque) required for the vehicle to travel to driving wheels. The travel driving force output device 200 includes, for example, a combination of an internal combustion engine, an electric motor, a transmission, and the like and an electronic control unit (ECU) that controls them. The ECU controls the above constituent elements according to information input from the second controller 160 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second controller 160 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the second controller 160 and transmits the hydraulic pressure of the master cylinder to the cylinder.

The steering device 220 includes, for example, a steering ECU and an electric motor. The electric motor, for example, applies a force to a rack-and-pinion mechanism to change the direction of the steering wheel. The steering ECU drives the electric motor according to information input from the second controller 160 or information input from the driving operators 80 to change the direction of the steering wheel.

[Functions of Travel Situation Recognizer]

The travel situation recognizer 132 recognizes travel situations of the own vehicle M on the basis of information input from the camera 10, the radar device 12, and the finder 14 via the object recognition device 16. The travel situations of the own vehicle M include, for example, the position and speed of the own vehicle M, the positions and speeds of other vehicles, a congestion situation, and the shape of a road. For example, the travel situation recognizer 132 recognizes the congestion situation on the basis of the speed of the own vehicle M and the number of other vehicles present within a predetermined range around the position of the own vehicle M. The congestion state may be a result of determination of the presence or absence of congestion or may be the degree of congestion.

The travel situation recognizer 132 may recognize the type of the traveling road on which the own vehicle M is traveling (for example, a road exclusively for automobiles, an expressway, or an ordinary road) and detailed information such as whether or not the traveling lane is separated from the oncoming lane by a median strip or the like on the basis of an analysis result of an image captured by the camera 10 or the like. The travel situation recognizer 132 may also recognize the type of the traveling road and detailed information by referring to map information (for example, the first map information 54 or the second map information 62) on the basis of position information of the own vehicle M.

[Functions of Traffic Sign Recognizes]

Figure 3:
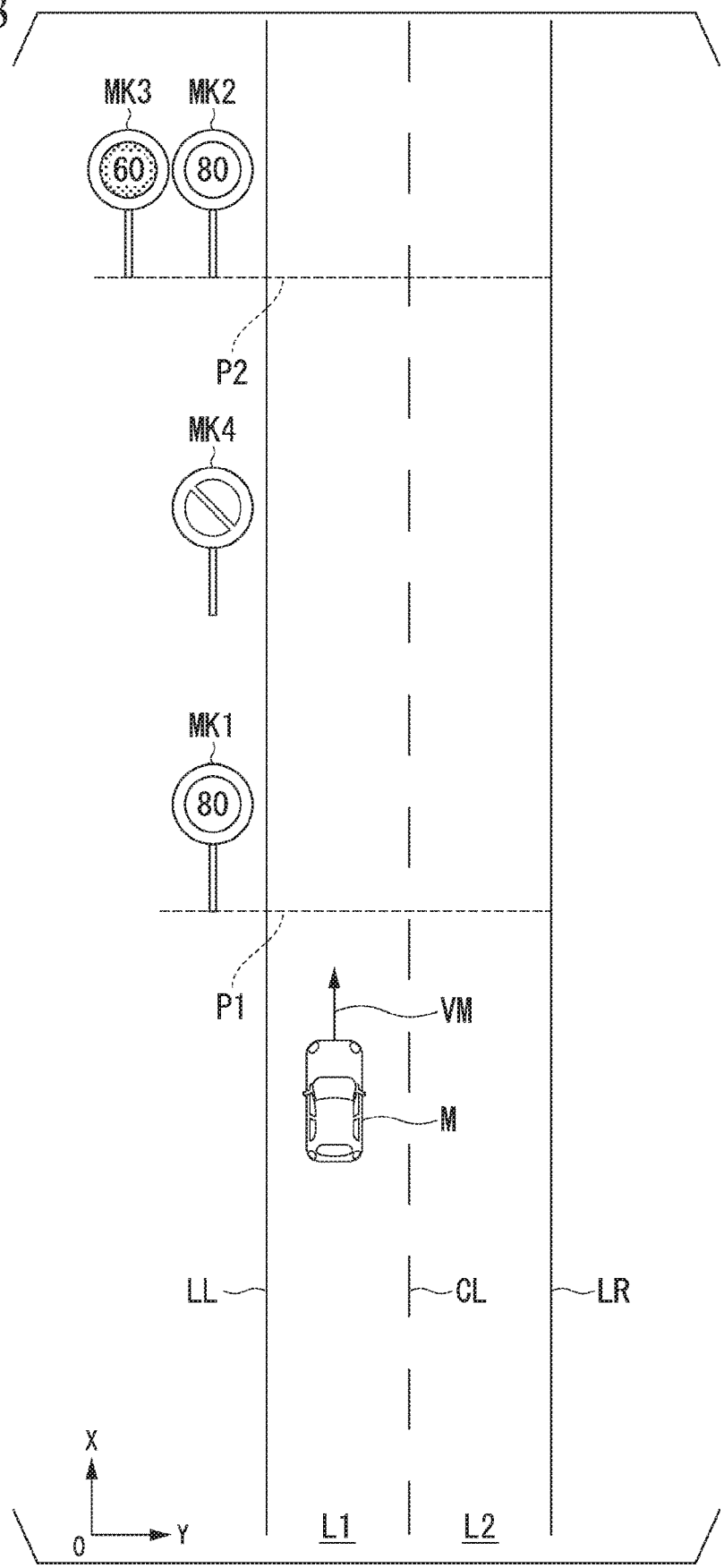
FIG. 3 is a diagram for explaining processing of a traffic sign recognizer.

The traffic sign recognizer 134 recognizes traffic signs on the road on which the own vehicle M is traveling on the basis of information input from the camera 10, the radar device 12, and the finder 14 via the object recognition device 16. Traffic signs are, for example, sign boards indicating traffic regulations on the traveling road or the like and include a regulation sign, an instruction sign, a warning sign, a guide sign, and the like. Traffic signs may be installed in the vicinity of the road (lane) and may be temporarily placed in the vicinity of a construction point, an accident vehicle, or the like on the road. Traffic signs may also be drawn on the surface of the road. FIG. 3 is a diagram for explaining processing of the traffic sign recognizer 134. In the example of FIG. 3, a road on which vehicles can travel in two lanes in the same direction is shown, and it is assumed that the own vehicle M is traveling at a speed VM in a left lane L1 among lanes L1 and L2 partitioned by road lane lines LL, CL, and LR.

For example, the traffic sign recognizer 134 analyzes an image captured by the camera 10 and recognizes traffic signs corresponding to the road (the lanes L1 and L2) where the own vehicle M is present by pattern matching processing using color and shape. In the example of FIG. 3, the traffic sign recognizer 134 recognizes traffic signs MK1 to MK4 corresponding to the lanes L1 and L2. The traffic sign recognizer 134 recognizes speed signs relating to speed limits among the recognized traffic signs. In the example of FIG. 3, the traffic sign recognizer 134 recognizes traffic signs MK1 to MK3 as speed signs. The traffic sign MK1 defines, for example, the speed limit of a section from a point P1 to a point P2. Each of the traffic signs MK2 and MK3 defines the speed limit of a predetermined section from the point P2.

The traffic sign recognizer 134 may distinguish between and recognize fixed and variable signs from among the recognized speed signs. A fixed sign is, for example, a sign with a fixed speed limit indicated thereon. A variable sign is a sign which can change the indicated speed limit, for example, depending on the time zone or by remote control from an external device. The variable sign may display a different speed limit, for example, by changing the lit part of a light emitting diode (LED) array or may indicate a different speed limit by electrically replacing a plurality of prepared speed signs. For example, the traffic sign recognizer 134 analyzes the image captured by the camera 10 and distinguishes between fixed and variable signs on the basis of shape and color information of the traffic signs. In the example of FIG. 3, the traffic sign recognizer 134 recognizes the traffic signs MK1 and MK2 as fixed signs and recognizes the traffic sign MK3 as a variable sign.

The traffic sign recognizer 134 may refer to the map information on the basis of the position information of the own vehicle M to recognize information regarding the speed limit of the road corresponding to the position information of the own vehicle M. FIG. 4 is a diagram showing examples of speed limits included in map information. The map information MP shown in FIG. 4 includes, for example, information regarding the speed limits of sections of roads on the basis of environments of the roads such as the shapes of the roads, the widths of the roads, and the presence or absence of tunnels. The map information MP may also include information indicating positions where signs are present and whether the signs are fixed or variable. For example, if no road signs can be recognized even when the own vehicle M has traveled a predetermined section, the traffic sign recognizer 134 recognizes a speed limit included in the map information MP on the basis of the current position. The traffic sign recognizer 134 may recognize both the speed of a speed sign in the recognition result from the camera 10 and the speed obtained from the map information MP. This can improve the accuracy of the recognized speed.

[Functions of Control State Changer]

The control state changer 142 performs control for changing (shifting) the control state of driving control on the basis of a first condition based on the travel situation of the own vehicle M recognized by the travel situation recognizer 132 and a second condition based on the traffic signs recognized by the traffic sign recognizer 134. For example, the control state changer 142 changes the control state of the own vehicle M on the basis of control state change data 192 stored in the storage unit 190. FIG. 5 is a diagram showing an example of the content of the control state change data 192. In the control state change data 192, for example, a first condition and a second condition are associated with each control state. The control state changer 142 changes the control state to one matching the first and second conditions and performs the driving control in the changed control state. Numerical values included in the first and second conditions of the control state change data 192 are not limited to those of the example of FIG. 5.

Here, first to third control states will be described in detail. For example, a plurality of sets of first and second conditions may be associated with each of the first to third control states. A plurality of control degrees may also be associated with each of the plurality of control states. A control degree is, for example, the degree of driving control of the own vehicle M and is set on the basis of the travel situation and the speed of the speed sign. In the control state change data 192, two sets of first and second conditions are set for the third control state. First and second conditions for two control degrees are set for the second control state. That is, in the example of FIG. 5, there are four control degrees 1 to 4. The conditions shown in the example of FIG. 5 are merely examples and, for example, speeds shown in the first and second conditions may be changed to others.

When the own vehicle M is traveling on a general road or the like and the speed limit is less than 40 km/h, the control state changer 142 changes the control state to the first control state (with control degree 1) and performs the driving control in the first control state. The first control state includes, for example, a state in which the steering and acceleration/deceleration of the own vehicle M are controlled by the occupant's driving operation to cause the own vehicle M to travel (so-called manual driving).

Even when the own vehicle M is traveling at a branch/merge point (a branch or merge point), the control state changer 142 suppresses operation in the second control state (with control degree 2) if the speed limit of the lane is less than a predetermined speed (for example, 40 km/h). When the own vehicle M is traveling at a branch/merge point and the speed limit of the lane is 40 km/h or more, the control state changer 142 changes the control state of the own vehicle M to the second control state (with control degree 2) (without suppressing operation in the second control state (with control degree 2)). The control state changer 142 may perform (may not suppress) operation in the second control state (with control degree 2), for example, at a branch/merge point such as a junction and may suppress operation in the second control state (with control degree 2) at a branch/merge point in an interchange.

In the second control state, it is possible to perform driving control such as adaptive cruise control (ACC), lane keeping assistance system (LKAS), auto lane changing (ALC), driver lane changing (DLC) and the like. The ACC is, for example, driving control for causing the own vehicle M to follow a preceding vehicle. The LKAS is, for example, driving control for maintaining a lane in which the own vehicle M travels. The ALC is driving control for performing, for example, lane change without requiring the occupant's turn signal operation on the basis of route setting of the navigation device 50. The ALC includes, for example, lane change in automated overtaking control and lane change at a branch. The DLC is driving control for performing lane change toward a direction indicated on the basis of the occupant's turn signal operation.

In the case of performing the driving control in the second control state (with control degree 2), the occupant needs to grip or operate the steering wheel which is a driving operator 80 (hereinafter referred to as hands-on) and to monitor the surroundings of the own vehicle M (hereinafter referred to as eyes-on). If the occupant is not gripping or operating the steering wheel which is a driving operator 80 (hereinafter referred to as hands-off) during execution of the second control state (with control degree 2), the HMI controller 180 causes the HMI 30 to output an alarm sound to alert the occupant.

Even when the traveling position of the own vehicle M is a main line of an expressway, the control state changer 142 suppresses operation in the second control state (with control degree 3) if the speed limit is less than 70 km/h. When the traveling position of the own vehicle M is a main line of an expressway and the speed limit is 70 km/h or more, the control state changer 142 changes the control state of the own vehicle M to the second control state (control degree 3). In the case of performing the driving control in the second control state (with control degree 3), the occupant needs to be eyes-on although the occupant is permitted to be hands-off. In the case of performing the driving control in the second control state (with control degree 3), 30 to 135 km/h is permitted for the speed setting of the ACC by the occupant's arbitrary setting through the HMI 30. During execution of the second control state (with control degree 3), if the shape of the road is curved, the control state changer 142 may perform automated deceleration on the basis of the lateral acceleration of the own vehicle M or the turning angle.

For example, in the second control state (with control degree 3), the DLC or ALC is not executed if the occupant is eyes-off. In the second control state (with control degree 3), the DLC can be executed if the occupant is hands-on and eyes-on. In the second control state (with control degree 3), automated overtaking by the ALC can be executed when the occupant is hands-off and eyes-on and branching of the ALC can be executed when the occupant is hands-on and eyes-on.

When the travel situation of the own vehicle M is a predetermined situation, the control state changer 142 executes the third control state (with control degree 4) on the basis of the speed limit of the traffic sign. The third control state (with control degree 4) is, for example, driving control in which the occupant is permitted to be hands-off and eyes-off. The third control state includes, for example, a state of driving control using a traffic jam pilot (hereinafter referred to as a TJP). The TJP is, for example, a control mode in which the own vehicle M follows a preceding vehicle at a predetermined speed (for example, 60 km/h) or less or a control mode in which the own vehicle M follows a preceding vehicle while traveling on an expressway.

For example, when the travel situation of the own vehicle M is congested, the control state changer 142 may change the execution condition of the third control state on the basis of the speed limit of the traffic sign. In the control state change data 192, the speed condition of the own vehicle M for executing the third control state is made different on the basis of the speed limit indicated by the speed sign. Specifically, if the speed limit of the speed sign is 70 km/h or more during congestion, the control state changer 142 performs control for changing to the third control state when the speed VM of the own vehicle M is 40 km/h or less. If the speed limit of the speed sign is less than 70 km/h during congestion, the control state changer 142 performs control for changing to the third control state when the speed VM of the own vehicle M is 20 km/h or less.

The control state changer 142 may set an upper limit speed of the own vehicle M at the time of execution of the third control state and may shift to the operation of the second or first control state when the own vehicle M has exceeded the upper limit speed. In the above example, if the control state changer 142 changes the control state to the third control state when the speed limit of the speed sign is 70 km/h or more and the speed VM of the own vehicle M is 40 km/h or less during congestion, the control state changer 142 sets the upper limit speed to 60 km/h. If the control state changer 142 changes the control state to the third control state when the speed limit of the speed sign is less than 70 km/h and the speed VM of the own vehicle M is 20 km/h or less during congestion, the control state changer 142 sets the upper limit speed to 40 km/h. These numerical values of the upper limit speed are examples and may be varied depending on the type of the vehicle, the environment of the road, or the like. Then, when the speed VM of the own vehicle M has exceeded the upper limit speed set by the own vehicle M, the control state changer 142 performs control for shifting from the third control state to the operation of the second or first control state.

During execution of the third control state, the inter-vehicle distance with respect to the preceding vehicle is made wider in order to cope with falling objects and interruption of other vehicles. During execution of the third control state, lane change or the like is not performed. If there is interruption of another vehicle during execution of the third control state, the control state changer 142 may allow the HMI controller 180 to cause the HMI 30 to output a request to monitor the surroundings of the own vehicle M (hereafter referred to as eyes-on). For example, if the speed limit of the speed sign of the lane in which the own vehicle M is traveling changes during the operation of one of the first to third control states, the control state changer 142 performs the processing described above on the basis of the changed speed limit and performs an operation of the corresponding control state.

As described above, in the embodiment, the change of the control degree is suppressed when the speed indicated by the speed sign does not satisfy a predetermined condition. Thus, it is possible to suppress frequent changes of the control state on the basis of changes in the travel situation and thus it is possible to reduce the frequency of switching to driving by the occupant. By distinguishing between fixed and variable signs and changing the control state, it is possible to easily determine the control state even if the sign dynamically changes due to traffic accidents or the like. In the embodiment, it is possible to perform driving control that matches the traffic flow. Even if the occupant lacks a geographical sense of the traveling road, it is possible to easily recognize the control state and thus it is possible to perform driving control that more closely matches the sense of the occupant.

The control state changer 142 may change the control state on the basis of the presence or absence of a vehicle preceding the own vehicle M in addition to the fact that the control state change data 192 satisfies a predetermined condition. Thus, for example, even when the own vehicle M is in a traffic jam or when the own vehicle M cannot recognize road lane lines LL and CL, it is possible to perform driving in an appropriate control state such as following of the preceding vehicle using the trajectory of the preceding vehicle. When there is a preceding vehicle, the control state changer 142 may change the control degree of the driving control on the basis of the type of the preceding vehicle or the travel speed of the preceding vehicle.

Figure 6:
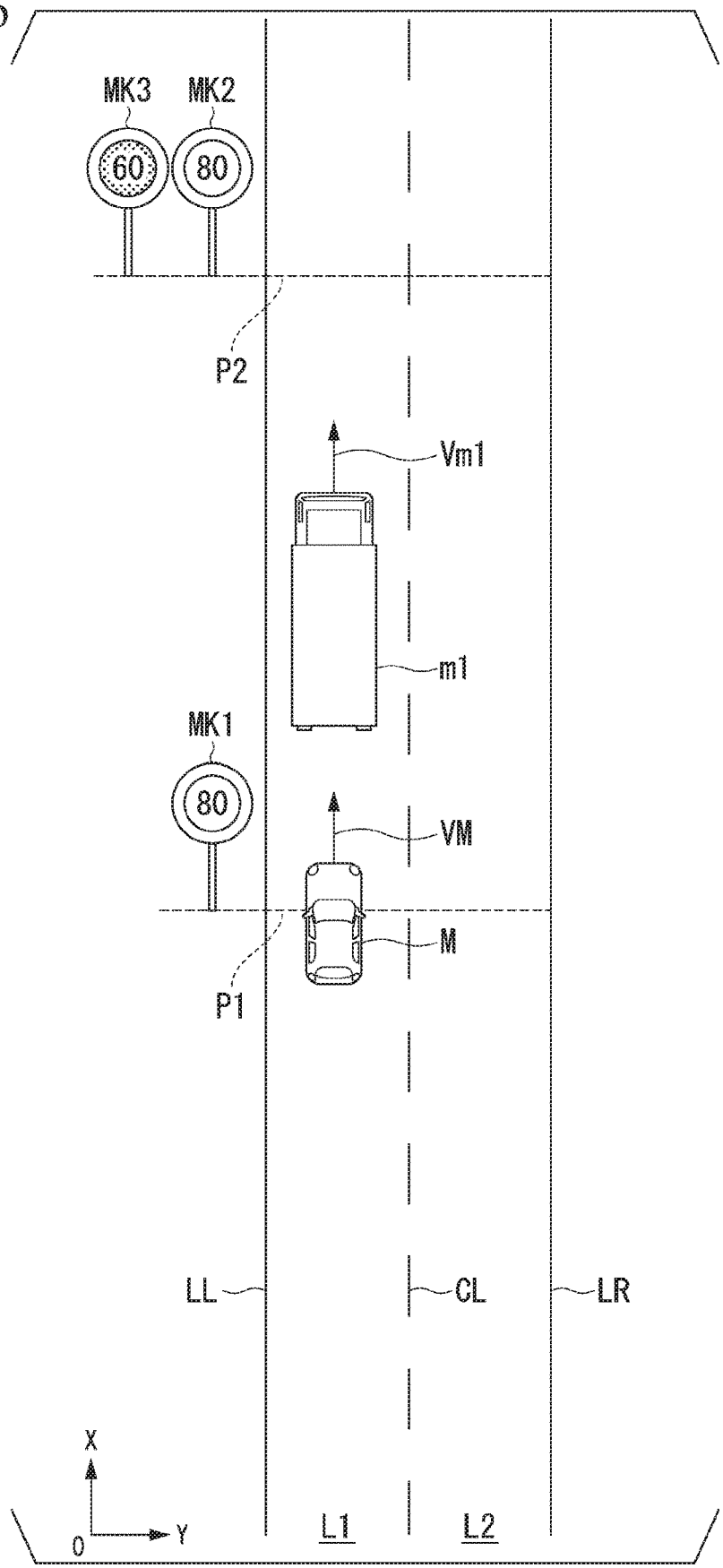
FIG. 6 is a diagram for explaining processing of a control state changer when a preceding vehicle is a large-sized vehicle.

FIG. 6 is a diagram for explaining processing of the control state changer 142 when a preceding vehicle is a large-sized vehicle. In the example of FIG. 6, it is assumed that another vehicle m1 is a large-sized vehicle (truck) and is traveling at a speed Vm1 in the extension direction of a road (X direction in the figure). Here, when the own vehicle M follows the other vehicle m1 which is a preceding vehicle, normal automobiles like the own vehicle M sometimes cannot travel on the road with steps, obstacles, or the like although large-sized vehicles can travel with them. Also, the speed limit may be different between large vehicles and regular vehicles. Therefore, when the preceding vehicle is a large-sized vehicle, the control state changer 142 suppresses the change of the control state even when the first and second conditions satisfy the predetermined conditions of the control state.

Figure 7:
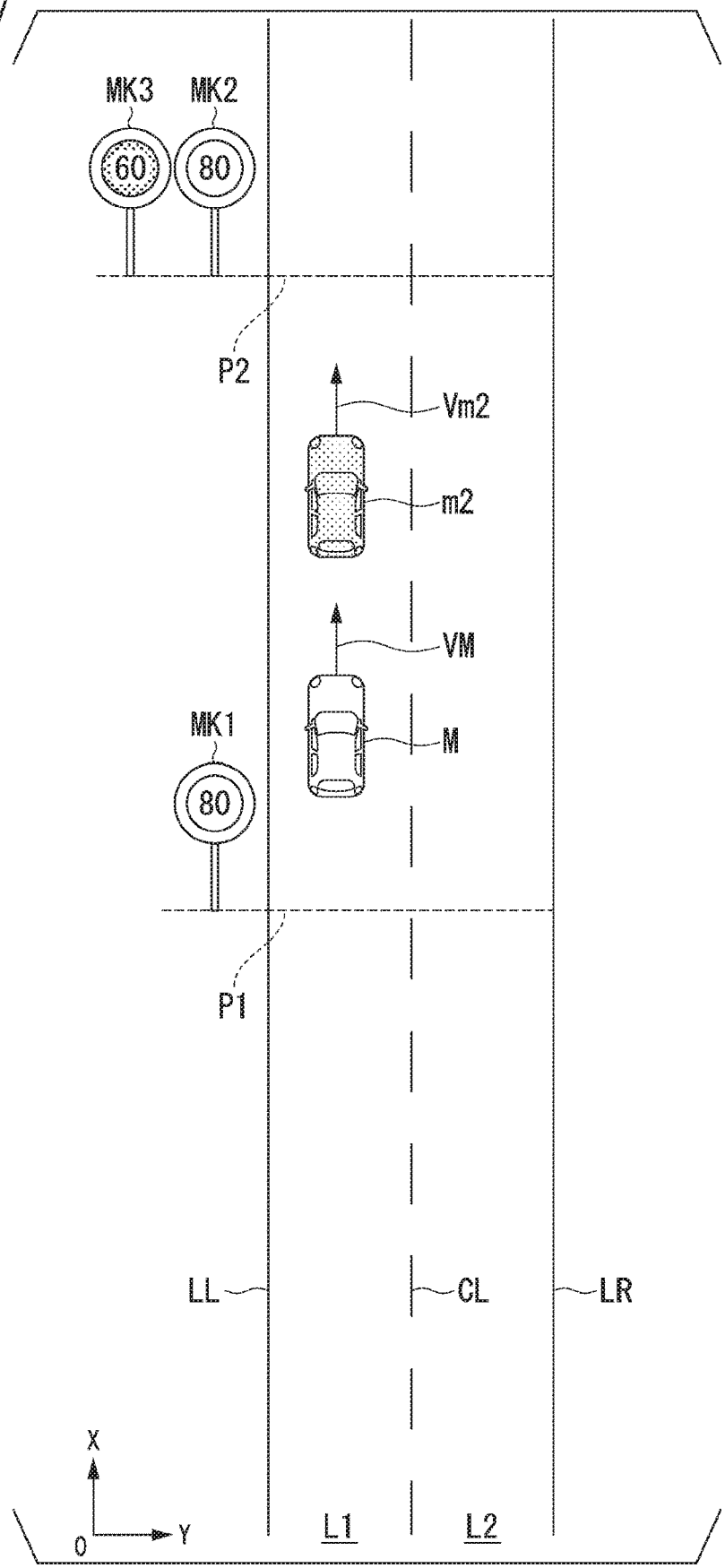
FIG. 7 is a diagram for explaining processing of the control state changer when a preceding vehicle is a regular vehicle.

FIG. 7 is a diagram for explaining processing of the control state changer 142 when a preceding vehicle is a regular vehicle. In the example of FIG. 7, it is assumed that another vehicle m2 is the same regular vehicle as the own vehicle M and is traveling at a speed Vm2 in the extension direction of a road. Here, when the own vehicle M follows the other vehicle m2, the content of travel control and the speed limit will be the same as that of the own vehicle M if the other vehicle m2 is the same type of vehicle as the own vehicle M. Thus, when the other vehicle m2 which is a preceding vehicle is a regular vehicle, the control state changer 142 changes the control state to one satisfying the first and second conditions. The control state changer 142 may change the control state to one satisfying the first and second conditions when the speed Vm2 of the other vehicle m2 is equal to or more than a threshold value and suppress the change of the control state when the speed Vm2 is less than the threshold value.

When changing the control state from the first control state to the third control state, the control state changer 142 may perform driving control for shifting stepwise from the first control state to the second control state and then to the third control state. When conditions for shifting to the third control state in the control state change data 192 are satisfied during operation in the first control state, the control state changer 142 may perform driving control for shifting from the first control state to the third control state without going through the second control state. When changing the control state from the third control state to the first control state, the control state changer 142 may perform driving control for shifting stepwise as described above or may perform driving control for shifting from the third control state to the first control state without going through the second control state. As a result, it is possible to perform appropriate driving control on the basis of the travel situation of the own vehicle M and the speed limit of the speed sign. Thus, the control state changer 142 can perform driving control suitable for the surrounding situation more quickly by shifting the control state between the first control state and the third control state without going through the second control state.

The control state changer 142 may make the control degree of the driving control different between when a speed limit of a fixed sign has been recognized by the traffic sign recognizer 134 and when a speed limit of a variable sign has been recognized. For example, when both a fixed sign and a variable sign have been recognized by the traffic sign recognizer 134, the control state changer 142 prioritizes the speed of the variable sign. In the example of FIG. 7, among the speeds of a traffic sign (fixed sign) MK2 and a traffic sign (variable sign) MK3 present at a point P2, the control state changer 142 prioritizes the speed of the traffic sign MK3. This makes it possible to perform driving control that matches the traffic flow on the basis of a speed associated with the current situation of the road (for example, a situation of congestion depending to the time zone, occurrence of an accident, or construction in progress). Thus, it is possible to perform driving control that more closely matches the sense of the occupant.

When both a fixed sign and a variable sign have been recognized by the traffic sign recognizer 134, the control state changer 142 may prioritize one of them with a lower speed. This makes it possible to perform driving control appropriate for a low speed.

The control state changer 142 may cause the HMI controller 180 to notify the occupant of information regarding a traffic sign through the HMI 30 when the number of times the traffic sign has been recognized is less than a predetermined number and may suppress the operation of the second control state when the number of times the traffic sign has been recognized is equal to or more than the predetermined number. More specifically, the control state changer 142 may change the content of the driving control, for example, on the basis of the respective number of times a fixed sign or a variable sign has been recognized. For example, when a fixed sign is recognized by the traffic sign recognizer 134, the control state changer 142 performs control relating to the change of the control state with one recognition of the fixed sign, and when a variable sign is recognized, the control state changer 142 performs control relating to the change of the control state with a plurality of recognitions of the variable sign.

Figure 8:
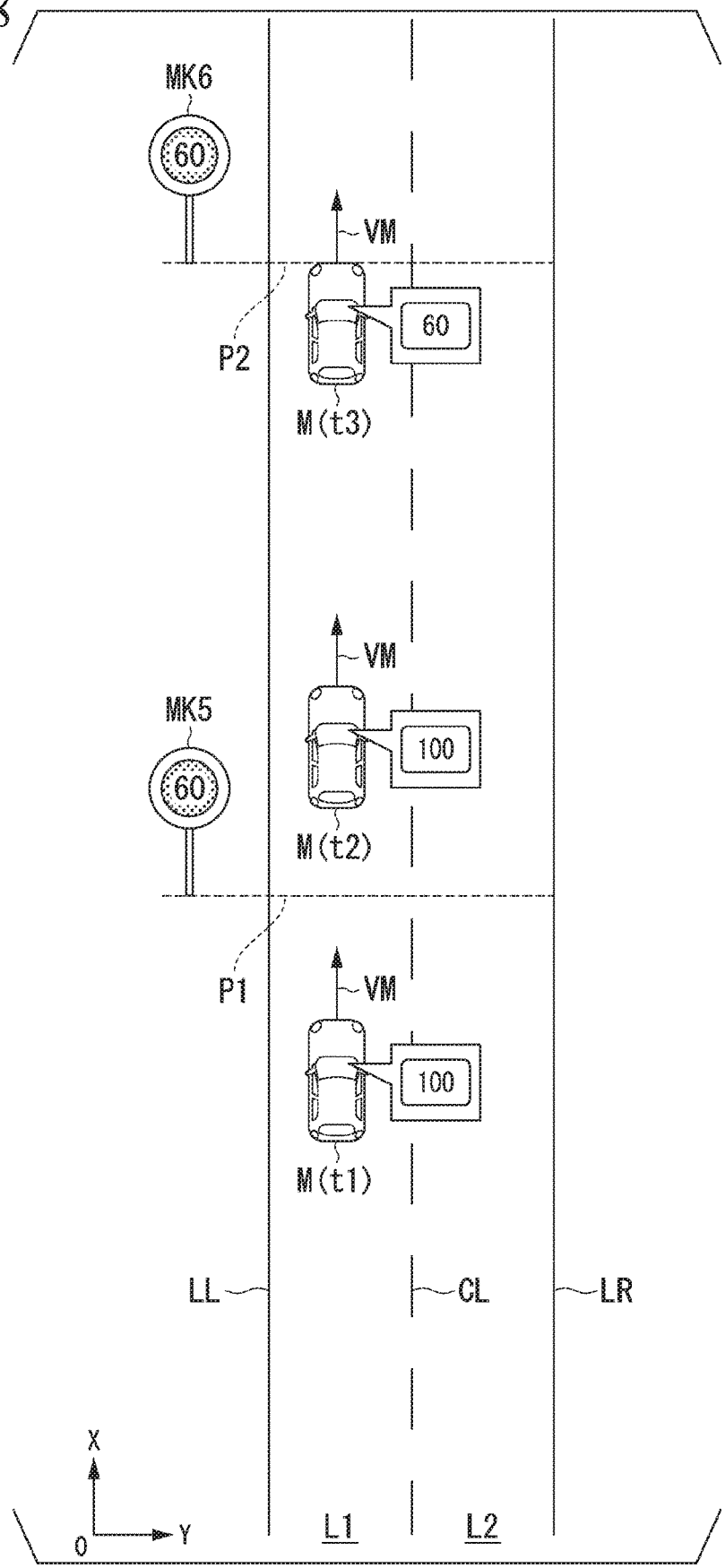
FIG. 8 is a diagram for explaining processing of the control state changer when variable signs are recognized.

FIG. 8 is a diagram for explaining processing of the control state changer 142 when variable signs are recognized. In the example of FIG. 8, it is assumed that a variable sign MK5 is present at a point P1 and a variable sign MK6 is present at a point P2. In the example of FIG. 8, M(t1) to M(t3) indicate the positions of the own vehicle M at times t1 to t3. In the example of FIG. 8, it is also assumed that the speed VM of the own vehicle M(t1) at time t1 is 100 km/h. For example, when a first variable sign MK5 is recognized by the traffic sign recognizer 134, the control state changer 142 determines whether or not there is a deviation equal to or greater than a threshold value (for example, ±20 km/h) between a speed limit (60 km/h) indicated by the variable sign MK5 and the speed VM of the own vehicle M and notifies the occupant through the HMI controller 180 to urge the occupant to change the set speed if there is such a deviation.

Figure 9:
FIG. 9 is a diagram for explaining processing of the HMI controller.

FIG. 9 is a diagram for explaining processing of the HMI controller 180. When there is a deviation equal to or greater than the threshold value between the speed limit indicated by the variable sign MK5 and the speed VM of the own vehicle M, the HMI controller 180 generates an image IM1 shown in FIG. 9 and causes a display device of the HMI 30 or the like to display the generated image under the control of the control state changer 142. The image IM1 of FIG. 9 includes, for example, a message "Please set the speed of the vehicle according to the speed of the sign" and a message "The control state will be changed when a next speed sign is recognized." The HMI controller 180 may also audibly output a message similar to the message indicated in the image IM1 through a speaker of the HMI 30 or the like.

Then, the control state changer 142 changes the control state when a second variable sign MK6 has been recognized by the traffic sign recognizer 134 and there is a deviation equal to or greater than the threshold value between a speed limit (60 km/h) indicated by the variable sign MK6 and the speed VM of the own vehicle M. The changed control state here is, for example, control for issuing a hands-on request to the own vehicle M(t3) or decelerating the own vehicle M(t3). Thus, it is possible to change the control state without causing the occupant to feel uncomfortable since the HMI controller 180 can notify the occupant of the content of future travel control.

The control state changer 142 may also correct the content of the driving control state on the basis of both a target speed of the own vehicle M that the occupant has set by operating the HMI 30 and the speed of a speed sign recognized by the traffic sign recognizer 134. For example, if there is a deviation equal to or greater than the threshold value between the speed set by the occupant and the speed of the speed sign in a state in which the second control state (with control degree 3) is in operation, the control state changer 142 may perform correction such as restricting the width of the range of speeds settable by the occupant or issuing a hands-on request even in the second control state (with control degree 3). Thereby, it is possible to perform driving control that more closely matches occupant's preferences.

[Process Flow]

Figure 10:
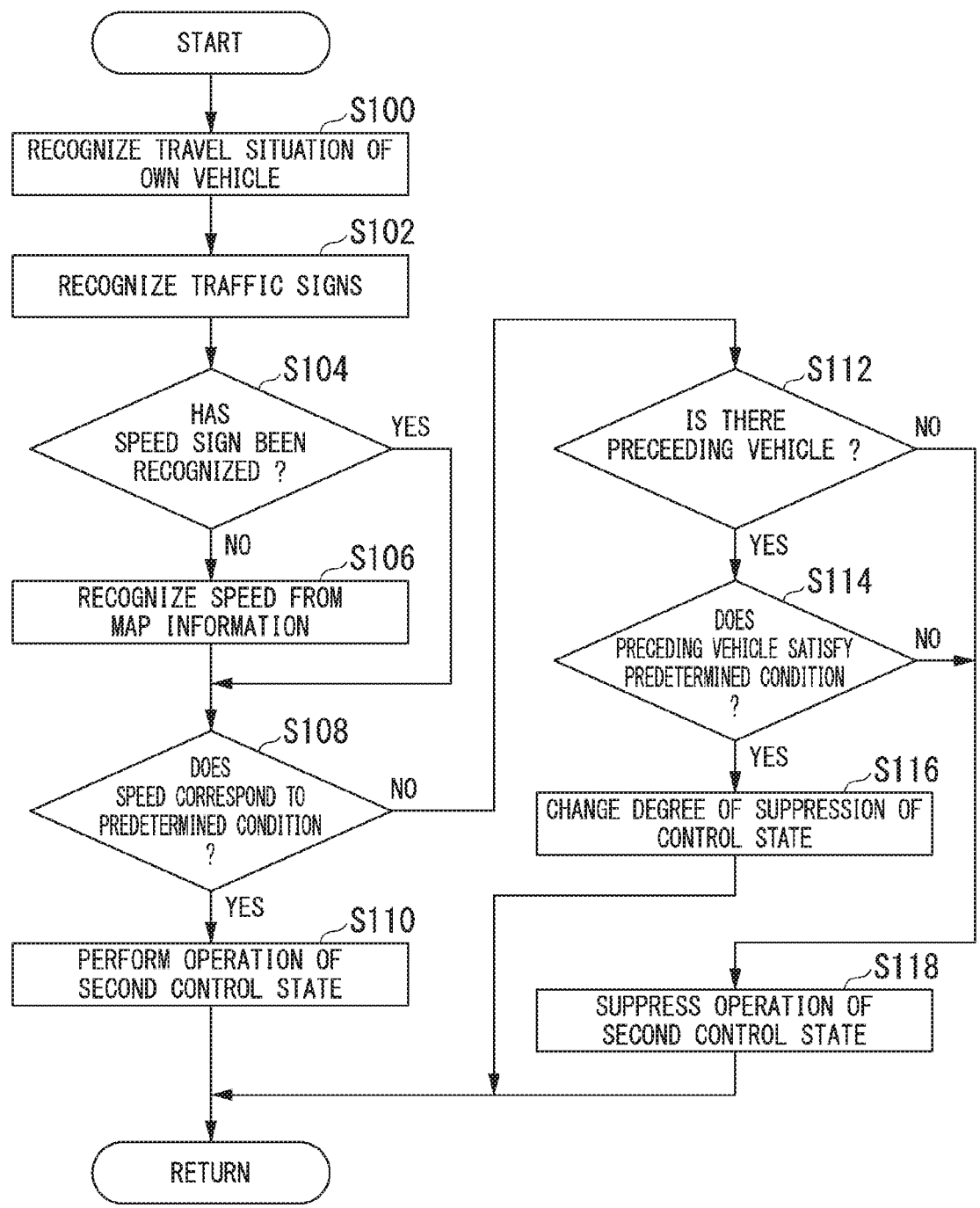
FIG. 10 is a flowchart showing the flow of processes executed by an automated driving control device according to the embodiment.

FIG. 10 is a flowchart showing the flow of processes executed by the automated driving control device 100 according to the embodiment. The process of this flowchart may be repeatedly performed, for example, at a predetermined cycle or at predetermined timings. When this flowchart starts, it is assumed that driving control in the first control state is being performed.

First, the travel situation recognizer 132 recognizes the travel situation of the own vehicle M (step S100). Next, the traffic sign recognizer 134 recognizes traffic signs on the road on which the own vehicle M is traveling (step S102). Next, the traffic sign recognizer 134 determines whether or not a speed sign has been recognized among the traffic signs (step S104). Upon determining that no speed sign has been recognized, the traffic sign recognizer 134 recognizes the speed of the traveling road from map information on the basis of the current position of the own vehicle M (step S106).

Upon determining in the process of step S104 that a speed sign has been recognized or after the process of step S106 is completed, the traffic sign recognizer 134 determines whether or not the recognized speed corresponds to a predetermined condition (step S108). Upon determining that the speed corresponds to the predetermined condition, the control state changer 142 performs operation in the second control state (step S110). Upon determining that the speed does not correspond to the predetermined condition, the recognizer 130 determines whether or not there is a preceding vehicle (step S112). Upon determining that there is a preceding vehicle, the control state changer 142 determines whether or not the preceding vehicle satisfies a predetermined condition (step S114). Upon determining that the preceding vehicle satisfies the predetermined condition, the control state changer 142 changes the degree of suppression of the control state (step S116). In the process of step S116, using the travel situation of the own vehicle M and the speed limit of the speed sign, the control state changer 142 refers to the control state change data 192 and changes the driving control to the second control state or the third control state.

If it is determined in the process of step S112 that there is no preceding vehicle or if it is determined in the process of step S114 that the preceding vehicle does not satisfy the predetermined condition, the operation of the second control state is suppressed (step S118). Then, the process of this flowchart ends. The process of step S106 described above may be executed irrespective of whether or not a speed sign has been recognized.

According to the embodiment described above, the automated driving control device 100 includes the traffic sign recognizer 134 configured to recognize the content of a traffic sign corresponding to a road on which the own vehicle M is present and the driving controller (the behavior plan generator 140 and the second controller 160) configured to perform driving control for controlling one or both of steering or acceleration/deceleration of the own vehicle M on the basis of the content of the traffic sign recognized by the traffic sign recognizer 134, wherein the driving controller operates at least in one of a first control state and a second control state in which the automation rate is higher than the first control state or a lower level of task is required of the occupant than the first control state and does not suppress operation in the second control state if the traffic sign recognized by the traffic sign recognizer 134 is a sign indicating a speed limit equal to or higher than a predetermined speed and suppresses operation in the second control state if the traffic sign is a sign indicating a speed limit less than the predetermined speed, whereby it is possible to perform driving control that matches traffic flow.

Specifically, according to the embodiment, when it is possible to perform driving control in a plurality of control states, it is possible to set an upper limit level of the control state on the basis of the speed sign. Even when driving control based on the speed of the speed sign is being performed, it is possible to release the upper limit level of the control state on the basis of the travel situation such as congestion and to perform driving control with a higher control degree in the third control state. Thus, even when the occupant lacks a geographical sense of the traveling road, it is possible to perform automated driving that matches the sense of the occupant.

[Hardware Configuration]

Figure 11:
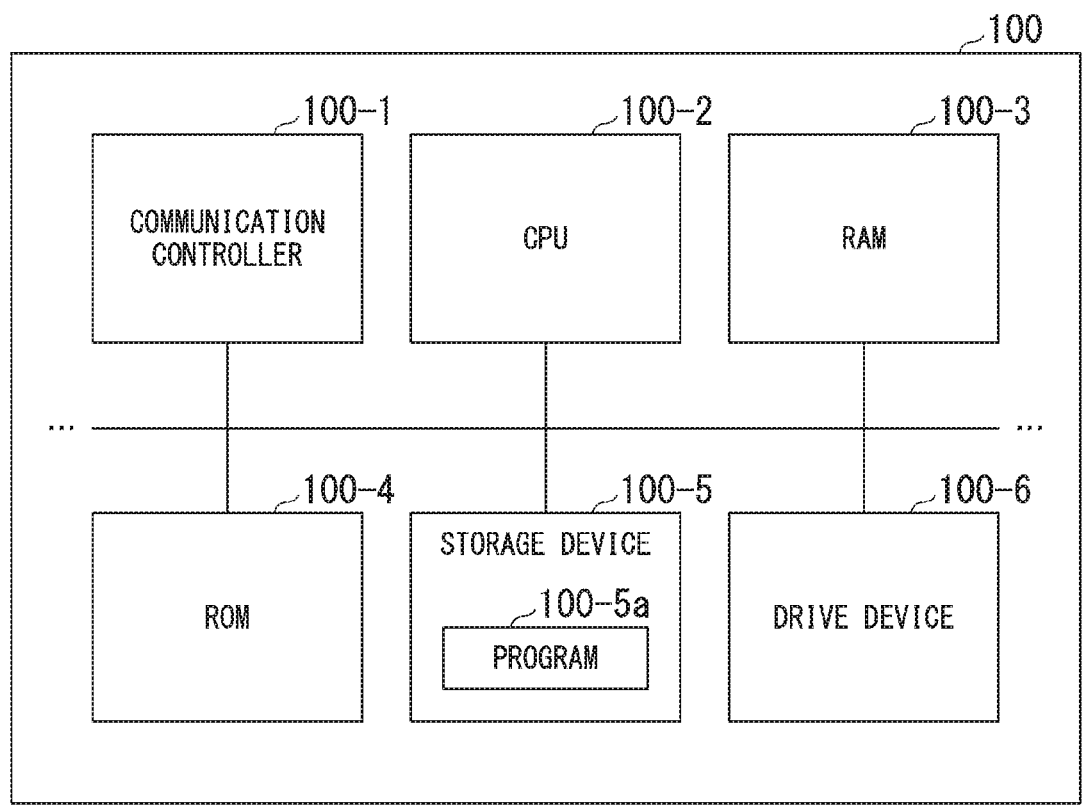
FIG. 11 is a diagram showing an example of the hardware configuration of the automated driving control device according to the embodiment.

FIG. 11 is a diagram showing an example of the hardware configuration of the automated driving control device 100 according to an embodiment. As shown, the automated driving control device 100 is configured such that a communication controller 100-1, a CPU 100-2, a RAM 100-3 used as a working memory, a ROM 100-4 storing a boot program or the like, a storage device 100-5 such as a flash memory or an HDD, a drive device 100-6, or the like are connected to each other via an internal bus or a dedicated communication line. The communication controller 100-1 performs communication with components other than the automated driving control device 100. A portable storage medium such as an optical disc (for example, a computer readable non-transitory storage medium) is mounted in the drive device 100-6. The storage device 100-5 stores a program 100-5a to be executed by the CPU 100-2. This program is loaded in the RAM 100-3 by a direct memory access (DMA) controller (not shown) or the like and then executed by the CPU 100-2. The program 100-5a referred to by the CPU 100-2 may be stored in the portable storage medium mounted in the drive device 100-6 or may be downloaded from another device via a network. Thereby, some or all of the first controller 120, the second controller 160, the HMI controller 180, and the storage unit 190 of the automated driving control device 100 are realized.

The embodiments described above can be expressed as follows.

A vehicle control device including:
a storage device configured to store a program; and
a hardware processor,
wherein the hardware processor is configured to execute the program stored in the storage device to:
recognize content of a traffic sign corresponding to a road on which a vehicle is present; and
perform driving control for controlling one or both of steering or acceleration/deceleration of the vehicle on the basis of the recognized content of the traffic sign,
wherein the vehicle control device operates at least in one of a first control state and a second control state in which an automation rate is higher than the first control state or a lower level of task is required of an occupant than the first control state, and does not suppress operation in the second control state if the recognized traffic sign is a sign indicating a speed limit equal to or higher than a predetermined speed and suppresses operation in the second control state if the traffic sign is a sign indicating a speed limit less than the predetermined speed.

Although the modes for carrying out the present invention have been described above by way of embodiments, the present invention is not limited to these embodiments at all and various modifications and substitutions can be made without departing from the gist of the present invention.

What is claimed is:

1. A vehicle control device comprising:
a recognizer configured to recognize content of a traffic sign corresponding to a road on which a vehicle is present; and
a driving controller configured to perform driving control for controlling one or both of steering or acceleration/deceleration of the vehicle on the basis of the content of the traffic sign recognized by the recognizer,
wherein the driving controller is configured to operate at least in one of a first control state and a second control state in which an automation rate is higher than the first control state or a lower level of task is required of an occupant than the first control state, and the driving controller is configured not to suppress operation in the second control state if the traffic sign recognized by the recognizer is a sign indicating a speed limit equal to or higher than a predetermined speed and configured to suppress operation in the second control state if the traffic sign is a sign indicating a speed limit less than the predetermined speed,
wherein the driving controller is configured to enable operation of a third control state in which the automation rate is higher than the second control state or a lower level of task is required of the occupant than the second control state, and to update an execution condition of the third control state on the basis of a speed limit of the traffic sign recognized by the recognizer,
wherein in the case that the speed limit of the traffic sign is a first speed or more during congestion, the driving controller performs control for changing to the third control state when the speed of the vehicle is a second speed lower than the first speed, and
wherein in the case that the speed limit of the traffic sign is less than the first speed during congestion, the driving controller performs control for changing to the third control state when the speed of the vehicle is a third speed lower than the second speed.

2. The vehicle control device according to claim 1, wherein the driving controller is configured to suppress operation in the second control state further on the basis of at least one of presence or absence of a vehicle preceding the vehicle, a type of the preceding vehicle, or a travel speed of the preceding vehicle.

3. The vehicle control device according to claim 1, wherein the driving controller is configured to enable operation of a third control state in which the automation rate is higher than the second control state or a lower level of task is required of the occupant than the second control state, and
the driving controller is configured to shift from the first control state to the third control state without going through the second control state if a condition for shifting to the third control state is satisfied during operation of the first control state.

4. The vehicle control device according to claim 1, wherein the recognizer is configured to distinguish between and recognize a fixed sign and a variable sign among the traffic signs; and
the driving controller is configured to make a reference for suppressing operation in the second control state different between when the fixed sign has been recognized by the recognizer and when the variable sign has been recognized.

5. The vehicle control device according to claim 4, wherein the driving controller is configured to prioritize the variable sign when both the fixed sign and the variable sign have been recognized by the recognizer.

6. The vehicle control device according to claim 4, wherein the driving controller is configured to prioritize a lower speed limit among speed limits of the fixed sign and the variable sign when both the fixed sign and the variable sign have been recognized by the recognizer.

7. The vehicle control device according to claim 4, wherein the driving controller is configured to suppress operation in the second control state when the fixed sign has been recognized by the recognizer once and to suppress operation in the second control state when the variable sign has been recognized by the recognizer a plurality of times.

8. The vehicle control device according to claim 1, further comprising a notification unit configured to notify an occupant of the vehicle of information; and
a notification controller configured to cause the notification unit to notify the occupant of information,
wherein the driving controller is configured to cause the notification controller to notify the occupant of information regarding the traffic sign when a number of times the traffic sign has been recognized by the recognizer is less than a predetermined number and to suppress operation in the second control state when the number of times the traffic sign has been recognized is equal to or greater than the predetermined number.

9. The vehicle control device according to claim 1, further comprising a setting unit configured to set a target speed of the vehicle on the basis of the occupant's operation,
wherein the driving controller is configured to correct content of the driving control on the basis of a speed of the traffic sign recognized by the recognizer and the target speed set by the setting unit.

10. A vehicle control device comprising:
a recognizer configured to recognize a surrounding situation of a vehicle; and
a driving controller configured to perform driving control for controlling one or both of steering or acceleration/deceleration of the vehicle on the basis of the surrounding situation recognized by the recognizer,
wherein the driving controller is configured to operate at least in one of a first control state, a second control state in which an automation rate is higher than the first control state or a lower level of task is required of the occupant than the first control state, and a third control state in which an automation rate is higher than the second control state or a lower level of task is required of the occupant than the second control state on the basis of the surrounding situation recognized by the recognizer, and the driving controller is configured to be able to shift from the first control state to the third control state without going through the second control state if a condition for shifting to the third control state is satisfied during operation of the first control state, wherein the driving controller updates an execution condition of the third control state on the basis of a speed limit of the traffic sign recognized by the recognizer, wherein in the case that the speed limit of the traffic sign is a first speed or more during congestion, the driving controller performs control for changing to the third control state when the speed of the vehicle is a second speed lower than the first speed, and wherein in the case that the speed limit of the traffic sign is less than the first speed during congestion, the driving controller performs control for changing to the third control state when the speed of the vehicle is a third speed lower than the second speed.

11. A vehicle control method comprising:

a vehicle control device recognizing content of a traffic sign corresponding to a road on which a vehicle is present; and performing driving control for controlling one or both of steering or acceleration/deceleration of the vehicle on the basis of the recognized content of the traffic sign, wherein the vehicle control device operates at least in one of a first control state and a second control state in which an automation rate is higher than the first control state or a lower level of task is required of an occupant than the first control state, and does not suppress operation in the second control state if the recognized traffic sign is a sign indicating a speed limit equal to or higher than a predetermined speed and suppresses operation in the second control state if the traffic sign is a sign indicating a speed limit less than the predetermined speed, wherein the vehicle control device enables operation of a third control state in which the automation rate is higher than the second control state or a lower level of task is required of the occupant than the second control state, and updates an execution condition of the third control state on the basis of a speed limit of the traffic sign recognized, wherein in the case that the speed limit of the traffic sign is a first speed or more during congestion, the vehicle control device performs control for changing to the third control state when the speed of the vehicle is a second speed lower than the first speed, and wherein in the case that the speed limit of the traffic sign is less than the first speed during congestion, the vehicle control device performs control for changing to the third control state when the speed of the vehicle is a third speed lower than the second speed.

12. A computer readable non-transitory storage medium storing a program causing a vehicle control device to:

recognize content of a traffic sign corresponding to a road on which a vehicle is present; and perform driving control for controlling one or both of steering or acceleration/deceleration of the vehicle on the basis of the recognized content of the traffic sign, wherein the vehicle control device operates at least in one of a first control state and a second control state in which an automation rate is higher than the first control state or a lower level of task is required of an occupant than the first control state, and the vehicle control device is caused not to suppress operation in the second control state if the recognized traffic sign is a sign indicating a speed limit equal to or higher than a predetermined speed and caused to suppress operation in the second control state if the traffic sign is a sign indicating a speed limit less than the predetermined speed, wherein the vehicle control device enables operation of a third control state in which the automation rate is higher than the second control state or a lower level of task is required of the occupant than the second control state, and updates an execution condition of the third control state on the basis of a speed limit of the traffic sign recognized, wherein in the case that the speed limit of the traffic sign is a first speed or more during congestion, the vehicle control device performs control for changing to the third control state when the speed of the vehicle is a second speed lower than the first speed, and wherein in the case that the speed limit of the traffic sign is less than the first speed during congestion, the vehicle control device performs control for changing to the third control state when the speed of the vehicle is a third speed lower than the second speed.

* * * * *